United States Patent [19]

Maurer et al.

[11] 4,200,071
[45] Apr. 29, 1980

[54] EXHAUST GAS CONTROL SYSTEM FOR AN INTERNAL COMBUSTION ENGINE

[75] Inventors: Helmut Maurer, Schwieberdingen; Ernst Linder, Mühlacker; Gerhard Dillmann, Markgröningen, all of Fed. Rep. of Germany

[73] Assignee: Robert Bosch GmbH, Stuttgart, Fed. Rep. of Germany

[21] Appl. No.: 860,491

[22] Filed: Dec. 14, 1977

[30] Foreign Application Priority Data

Dec. 18, 1976 [DE] Fed. Rep. of Germany ....... 2657608

[51] Int. Cl.² ...................... F02D 35/00; F02M 25/06
[52] U.S. Cl. ........................ 123/124 R; 123/117 A; 123/119 EC
[58] Field of Search ....... 123/119 A, 119 D, 119 DB, 123/119 EC, 124 A, 124 R, 124 B, 32 EE; 60/304, 305, 306

[56] References Cited

U.S. PATENT DOCUMENTS

| | | | |
|---|---|---|---|
| 3,961,608 | 6/1976 | Hertfelder | 123/119 A |
| 3,963,011 | 6/1976 | Saito et al. | 123/119 A |
| 4,005,691 | 2/1977 | Stumpp | 123/119 A |
| 4,061,117 | 12/1977 | Ikeura | 123/119 EC |
| 4,071,003 | 1/1978 | Aono | 123/119 A |

*Primary Examiner*—Wendell E. Burns
*Attorney, Agent, or Firm*—Edwin E. Greigg

[57] ABSTRACT

An internal combustion engine is equipped with an air line for admitting supplementary air to the induction manifold or the exhaust manifold in order to compensate for an intentional air deficiency, so as to make the mixture stoichiometric. The air line is throttled by a pneumatically activated throttle valve which is subject to at least two control pressures, one of these being the atmosphere or a constant pressure and the other being, for example, the induction tube vacuum. The termini of the two lines which admit these control pressures are so disposed in the valve as to be jointly openable and closable, in opposite phase, by an electromagnetically controlled valve-closing leaf-spring. The electromagnet is energized by a current of variable frequency, the frequency being dependent on the exhaust gas composition as monitored by an oxygen sensor.

15 Claims, 7 Drawing Figures

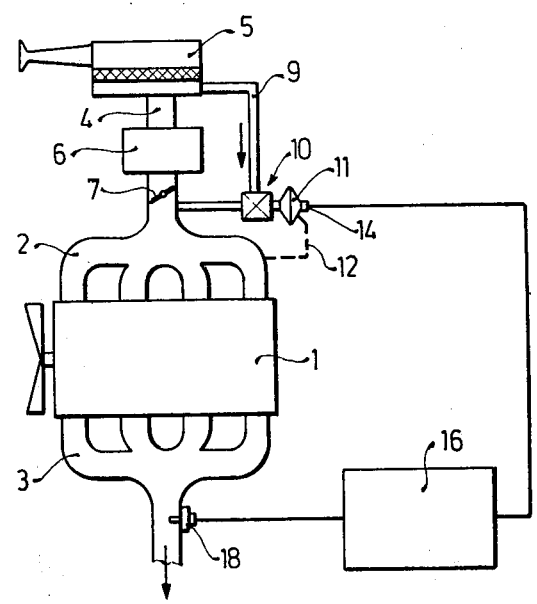
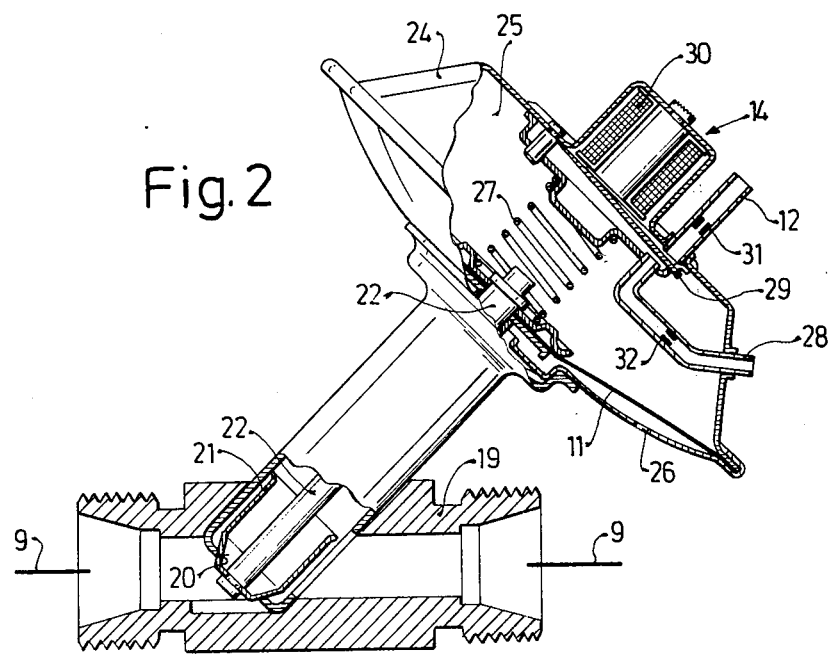

EXHAUST GAS CONTROL SYSTEM FOR AN INTERNAL COMBUSTION ENGINE

BACKGROUND OF THE INVENTION

The invention relates to internal combustion engines and more particularly to the control of the combustible mixture for internal combustion engines. Still more particularly the invention relates to an apparatus for controlling the flow of gas to and from the induction manifold of the engine in order to influence the composition of the combustible mixture and hence also influence the composition of the exhaust gas. In a known apparatus of this type, for example that made known by the German Offenlegungsschrift No. 24 31 046, there is provided a bypass channel around the main throttle valve of the engine for admitting additional fresh air to the combustible mixture. The bypass channel is controlled by a throttle which is actuated pneumatically. The control pressure for the pneumatic control element is taken from the narrowest portion of the venturi of the induction tube and may be modified by a solenoid valve according to the prevailing ambient pressure. The valve is actuated in dependence on the output signal from an oxygen sensor located in the exhaust system which provides pulses of constant frequency but variable length. The known controller for this valve includes several differential amplifiers and a sawtooth generator and thus is relatively expensive and is sensitive and subject to malfunctions.

OBJECT AND SUMMARY OF THE INVENTION

It is thus a principal object of the present invention to describe an apparatus in which the composition of the mixture provided to the internal combustion engine may be changed rapidly and with relatively simple means.

This object is attained according to the invention by providing a channel for the admission of air, either to the induction manifold or the exhaust manifold, and by providing within that channel a control valve. The control valve is actuated by a pneumatic final control element which can be subjected to one of two different pressures or an average pressure lying between the two pressures. The two pressures are admitted by separate lines between which operates an alternating elastic member which is controlled by an electromagnet which is in turn energized by means of a variable frequency generator. The frequency supplied to the actuating solenoid is a function of the exhaust gas composition, as monitored by an oxygen sensor.

By making the two pressure lines within the pneumatic control element alternately closable, the valve closing member may be a simple leaf spring fastened at one side and permitting very rapid response.

A distinct advantage of the invention is to use a voltage-to-frequency converter for generating a valve actuation frequency and including an astable multivibrator whose timing resistors are provided by transistors, the bases of which are controlled according to at least one operational parameter of the engine. The very low mass of the valve closing member in the pneumatic control element requires very low electric power. It is a particular feature of the invention that, when the frequency of actuation of the control valve in the pneumatic control element changes, the relative degree of opening of the two pressure lines is changed, thereby causing a relative change in the average opening time of the bypass control valve.

The invention will be better understood as well as further objects and advantages thereof become more apparent from the ensuing detailed description of two exemplary embodiments of the invention taken in conjuction with the drawing.

BRIEF DESCRIPTION OF THE DRAWING

FIG. 1 is a schematic diagram of a first exemplary embodiment of the invention illustrating a bypass channel around the carburetor of the engine;

FIG. 2 is a detailed sectional diagram of the bypass control valve in the embodiment of FIG. 1;

DESCRIPTION OF THE PREFERRED EMBODIMENTS

Figure 3:
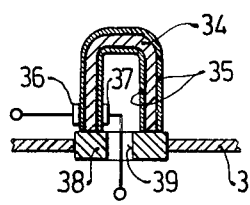
FIG. 3 is an illustration of an oxygen sensor used in the apparatus according to the invention.

Turning now to FIG. 1, there is shown schematically a first exemplary embodiment of the invention in which an engine 1 is provided with an induction manifold 2 and an exhaust manifold 3. The induction tube 4 has an air filter 5 and includes a mixture preparation system 6, beyond which there is disposed a randomly settable throttle valve 7. The mixture preparation system 6 may be a carburetor of known construction which meters out fuel into the induction tube 4 according to the differential pressure between the venturi vacuum and ambient air pressure. However, some other mixture preparation system, for example an induction tube fuel injection system, may also be used, in which case an air flow rate meter would be disposed upstream of the throttle valve 7 and its relative positive would be used to inject fuel into the induction tube 4 somewhere downstream of the throttle valve 7.

The invention provides that a bypass channel 9 is provided leading from the vicinity of the air filter 5 to a point within the induction tube downstream of the throttle valve 7. The free flow cross section of the bypass channel 9 can be altered by a bypass control valve 10 having a pneumatic control element 11. The pneumatic control element 11 receives operating pressure from a line 12 which connects it to the induction tube downstream of the throttle valve 7 and it is provided with an electromagnet 14 that controls a valve closing element which causes the pressure chamber within the pneumatic control element 11 to be connected either to the line 12 or to ambient pressure. The detailed construction of the bypass control valve 10 and its pneumatic control element 11 will now be discussed with reference to FIG. 2. The electromagnet 14 within the pneumatic control element 11 is actuated with a voltage of variable frequency coming from a control circuit 16 to be described in greater detail below. The control circuit 16 generates the variable frequency on the basis of signals from an oxygen sensor 18 located in the exhaust manifold 3 of the internal combustion engine.

The bypass control valve illustrated in FIG. 2 has a valve casing 19 with a flow aperture 20 which can be changed by the dome shaped throttling member 21 depending on its axial position. The throttling member 21 is mounted on a valve shaft 22 which is rigidly coupled to a flexible diaphragm 11' that is part of and moved by the pneumatic control element 11'. The diaphragm 11 defines a pressure chamber 25 within a housing 24, and the side facing the opening 20 is exposed to ambient pressure via an air hole 26. The pressure chamber 25 includes a biasing spring 27 urging the throttling member 21 to close the opening 20. The pressure chamber 25 is connected to the induction tube 4 of the engine via a line 12 and is further connected via a line 28 with ambient air. The two air lines 12 and 28 terminate in the pressure chamber 25 in mutually opposed directions. Located between the opposing openings of the lines 12 and 28 is a leaf spring 29, one end of which is fixedly attached to the housing 24 so that its fluttering motions cause alternate opening and closing of the two air lines 12 and 28. This leaf spring 29 is the armature of the centrally arranged electromagnet 14. At the points where the leaf spring makes contact with the lines 12 and 28, it is preferably covered with a sealing material.

The vacuum line 12 contains a fixed throttle 31 while the ambient air line 28 includes a fixed throttle 32. The degree of excitation of the electromagnet determines the degree to which the vacuum line is open. If the electromagnet is unenergized, the leaf spring may be biased to close the terminus of the line 28. However, it can also be adjusted to occupy a central position between the two air lines 12,28 depending on the dynamic behavior and the interaction of the throttles 31 and 32. The coil 30 of the electromagnet 14 is connected to and energized by the control circuit 16 which will be discussed below in connection with FIG. 5. The control circuit 16 processes the output signal of a known oxygen sensor, illustrated in FIG. 3, which is a tube 34 closed at one end, made from a solid electrolyte, for example sintered zirconium dioxide. Both sides of the tube are covered with microporous platinum layers 35 which have electrical contacts 36 and 37, respectively. The tube 11 is inserted into the wall of the exhaust manifold 3 by means of a fitting 38 and an opening 39 in the fitting permits the admission of ambient air to the interior of the tube.

A difference of the partial pressures of oxygen in the exhaust gas and in the reference medium in the interior of the tube causes a migration of ions through the electrolyte which generates a potential difference across the contacts 36 and 37 which is indicative of the relative absence or excess of oxygen in the exhaust gas.

Figure 4:
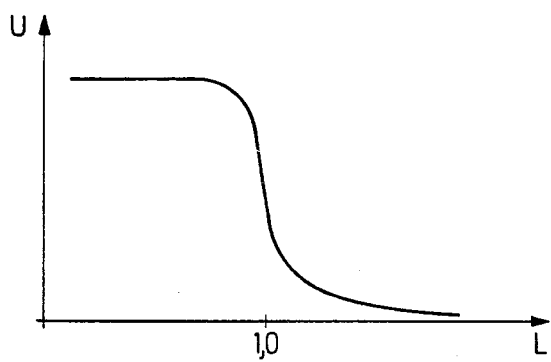
FIG. 4 is a diagram illustrating the oxygen sensor voltage as a function of the air-to-fuel ratio.

FIG. 4 illustrates the output voltage U from the oxygen sensor as a function of the air factor λ which is proportional to the ratio of air to fuel. It will be seen that when the mixture is stoichiometric, i.e. its air factor λ=1, the output voltage U of the oxygen sensor undergoes a drastic shift and this fact is exploited in known manner for a variety of engine controlling purposes.

Figure 5:
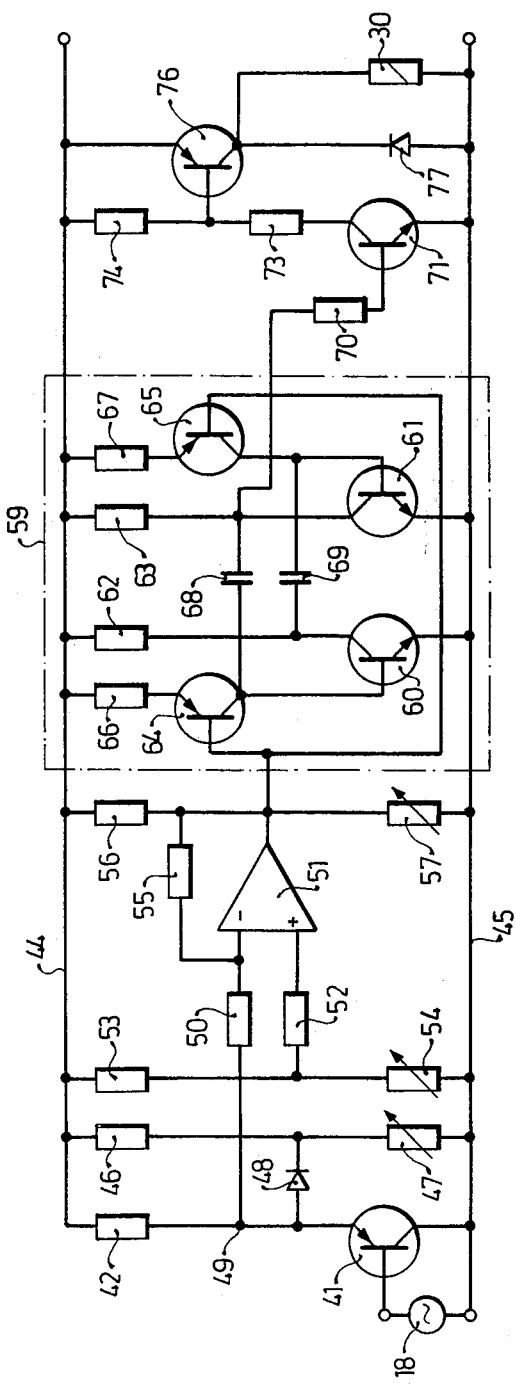
FIG. 5 is a detailed circuit diagram of the circuitry for controlling the operation of the bypass control valve.

The control circuit for processing the output of the oxygen sensor is illustrated in detail in FIG. 5. The output voltage from the oxygen sensor 18 is connected to the base of a PNP transistor 41 whose emitter-collector path is connected in series with a resistor 42 as a first voltage divider between the stabilized positive and negative supply lines 44 and 45, respectively. Connected in parallel to the first voltage divider is a second voltage divider consisting of a resistor 46 and an adjustable resistor 47. The tap 49 of the first voltage divider is connected via a diode 48 to the tap of the second voltage divider and is also connected through a resistor 50 with the inverting input of an operational amplifier 51. The non-inverting input of the operational amplifier 51 is connected through a resistor 52 to an adjustable voltage divider consisting of resistors 53 and 54. The output of the operational or differential amplifier 51 is fed back to its inverting input via a resistor 55 and is connected through a resistor 56 to the junction of resistors 56 and 57, respectively connected between the positive and negative supply lines 44,45. A major constituent of the circuit of FIG. 5 is a voltage-to-frequency converter 59 framed in dash-dotted lines which, in this example, includes an astable multivibrator in which the timing resistors usually present are replaced by transistors. In known manner, the multivibrator 59 includes two NPN transistors 60 and 61, whose emitters are connected to the negative supply line 45 and whose collectors are connected to respective resistors 62 and 63 to the positive supply line 45. It is a particular feature of the invention that the base of the transistor 60 is connected via the emitter-collector path of a PNP transistor 64 to the positive supply line 44 while the base of the transistor 61 is connected via the collector-emitter path of a PNP transistor 65 to the positive supply line 44 via respective emitter resistors 66 and 67. The bases of the transistors 64 and 65 are joined and are also connected to the output of the operational amplifier 51. The base of the transistor 61 is connected via a capacitor 69 to the collector of the transistor 60, while the base of the transistor 60 is connected via a capacitor 68 to the collector of the transistor 61.

The output signal of the astable multivibrator 59 is taken from the collector of the transistor 61 and is fed via a resistor 70 to the base of a further NPN transistor 71 whose emitter is connected to the negative supply line 45 and whose collector is connected through resistors 73 and 74 to the positive supply line 44. The junction of the resistors 73 and 74 is connected to the base of a PNP transistor 76 whose emitter is at positive potential and whose collector is connected to the cathode of a diode 77 whose anode is at negative potential while the actuating coil 30 of the previously referred-to electro-magnet 14 is connected between the collector of the transistor 76 and the negative supply 45.

Figure 6:
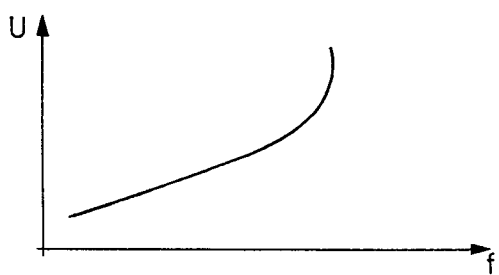
FIG. 6 is a diagram showing the functional relationship between the variable output frequency of the circuit of FIG. 5 as a function of input voltage.

The function of the circuit of FIG. 5 described above is as follows. The output voltage of the oxygen sensor 18, after passing the transistor 41, reaches the inverting input of the operational amplifier 51. The second voltage divider consisting of resistors 46 and 47 acts as a voltage-limiting circuit. The voltage applied to the non-inverting input of the operational amplifier 51 could, in principle, be varied as a function of operating conditions of the engine. The output voltage of the operational amplifier 51 thus substantially corresponds to the output voltage of the oxygen sensor 18 and is used to control the time constant of the astable multivibrator by being applied to the bases of the transistors 64 and 65. These transistors thus represent variable resistors, one of which cooperates with the resistor 66 and the capacitor 68, while the other cooperates with the resistor 67 and the capacitor 69 to determine the time spent by the multivibrator in the particular state. As a consequence, the potential at the collector of the transistor 61 is a voltage whose frequency depends on the oxygen sensor output signal. This output signal is taken through an amplifier consisting of transistors 71 and 76 to the coil 30 of the electromagnet 14. The diode 77 is to be regarded as for protective purposes. FIG. 6 is a diagram illustrating the output frequency of the multivibrator 59 as a function of sensor voltage U.

The above-described circuit and actuating elements make it possible to equip the internal combustion engine with a cost-effective simple carburetor which can be coarsely set to admit a slightly enriched fuel-air mixture. The exact adaptation to the stoichiometric value $\lambda=1$ or another desired value is then performed by supplying the necessary additional air via the bypass line 9 under the control of the oxygen sensor 18 as described above. This is done by interposing the circuit 16 according to FIG. 5 which changes the pressure in the chamber 25 of the control valve 10. The pressure in the chamber 25 is changed by exciting the electromagnet 14 at the frequency provided by the control circuit 16, thereby causing the leaf spring 29 to vibrate and to alternately open first the vacuum line 12 while closing the line 28 and thereafter to close the line 12 and open the line 28. Due to the inertia and the pretension or bias of the leaf spring, it is possible to cause one or the other of the lines 12 and 28 to be opened to an increasing degree for increasing frequency. It is possible to obtain any desired behavior of opening cross section as a function of time in either direction and thus to obtain the required variable pressure in the pressure chamber 25. This pressure moves the diaphragm 11 and thus actuates the valve member 21 causing a variable amount of secondary air to be supplied to the induction manifold of the engine. The throttles 31 and 32 are provided to cause the valve to act in an integrating manner. The above-described apparatus includes a relatively simple electric circuit and yet has the advantage of a very rapidly responding valve which permits very precise control of the fuel-air mixture to the value $\lambda=1$ or some other desired value.

The above-described apparatus is not limited to the use of an oxygen sensor as an input transducer. Any sensor or transducer which generates an abrupt voltage change as a function of some limiting parameter and which senses the composition of the exhaust gas or an operational variable related thereto can be used together with the above-described apparatus. Such sensors or transducers would be, for example, CO sensors, $CO_2$ sensors, $NO_x$ sensors or any transducer indicating the fluctuations of engine speed or detecting ion currents in the exhaust gas. Furthermore, the operating pressure for the pressure chamber 25 need not necessarily be taken from the induction tube of the engine but could be supplied, for example, from a storage container at constant pressure.

Figure 7:
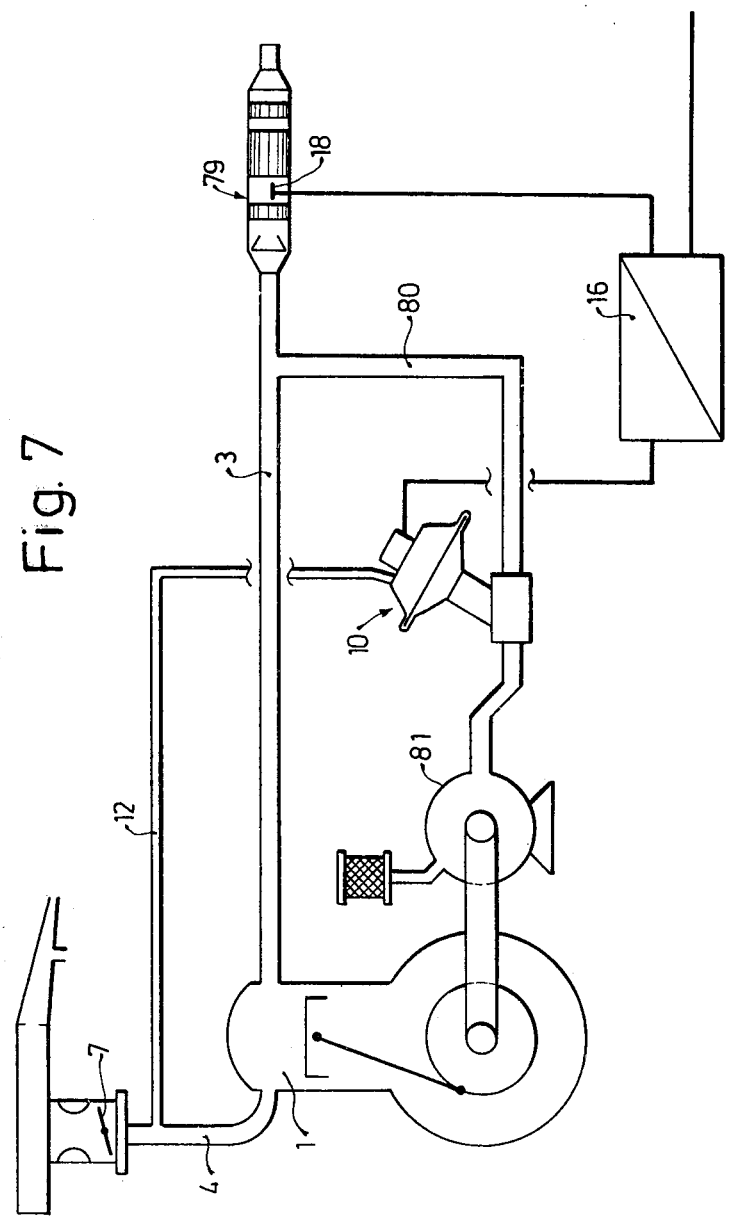
FIG. 7 is a schematic diagram of a second embodiment of the invention in which a bypass channel supplies additional air to the exhaust system of the engine.

A second exemplary embodiment of the invention is illustrated in FIG. 7 in which additional air is supplied to the exhaust system of the engine in order to reduce toxic emissions. As before, there is present an internal combustion engine 1 including an induction tube 4 with a throttle valve 7. A conduit 12 takes vacuum from the induction tube 4 downstream of the throttle valve 7 and admits it to the pressure chamber of a pneumatic control valve 10 of substantially the same construction as that illustrated in FIG. 2. The exhaust manifold 3 of the engine further includes a catalyzer 79, shown here as a single bed or a three-way catalyzer. A secondary air supply line 80 terminates upstream of the catalyzer in the exhaust system. The secondary air line 80 receives air from a secondary air pump 81 which is driven by the engine. Disposed within the catalyzer 79 is the previously referred to oxygen sensor 18 connected to the above-described control circuit 16. As before, the output of the control circuit 16 is connected to the actuating coil 30 of the electromagnet 14. The function of the present embodiment is substantially similar to that of the embodiment of FIG. 1 except that the aim here is to cause the engine to emit an exhaust gas of optimum composition. The basic setting of the mixture generator would be slightly rich and the control apparatus of the present invention then provides enough secondary air to the exhaust system so that the composition of the exhaust gas at the location of the oxygen sensor corresponds to an air factor $\lambda=1$, permitting an optimum detoxication of the exhaust gas with a minimum of substances such as $NO_x$, HC, or CO within the catalyzer.

It would be further possible to use the bypass control valve 10 and the control circuit 16 described above for controlling the amount of exhaust gas returned from the exhaust system to the induction tube 4 in an exhaust gas recycling scheme.

The foregoing relates to preferred exemplary embodiments of the invention, it being understood that other embodiments and variants thereof are possible within the spirit and scope of the invention.

What is claimed and desired to be secured by Letters Patent of the United States is:

1. In an internal combustion engine, said engine including an induction manifold and an exhaust manifold, a conduit for supplying a gas to said engine and a pneumatically actuated throttle in said conduit for varying the amount of said gas supplied to said engine, means for sensing the exhaust gas composition and control means for changing the actuation pressure in said pneumatically actuated throttle as a function of said exhaust gas composition, the improvement comprising:
    said pneumatically actuated throttle includes a pressure chamber which is connected by gas lines to at least two sources of pressure, the terminus of at least one of said gas lines being closable to varying degrees by elastic means, said elastic means being at least part of the armature of an electromagnet, said electromagnet being connected to and energized by said control means and said control means energizing said electromagnet with a voltage of variable frequency, said frequency being dependent on said exhaust gas composition.

2. An internal combustion engine as defined by claim 1, wherein the termini of said gas lines are so disposed as to be alternately openable and closable by said elastic means.

3. An internal combustion engine as defined by claim 1, wherein said elastic means is a leaf spring fixed in said throttle at one end, the free end of which being disposed between opposite termini of said gas lines.

4. An internal combustion engine as defined by claim 3, wherein said elastic means and said electromagnet are disposed within the pressure chamber of said pneumatically actuated throttle.

5. An internal combustion engine as defined by claim 4, wherein at least one of said at least one gas lines includes a flow throttle.

6. An internal combustion engine as defined by claim 1, wherein the first of said two sources of pressure is the induction tube pressure of the engine and wherein the second of said at least two sources of pressure is the atmosphere.

7. An internal combustion engine as defined by claim 1, wherein said control means includes a voltage-to-frequency converter for converting the signal from said means for sensing the exhaust gas composition and converting it into a voltage of variable frequency for actuating said electromagnet.

8. An internal combustion engine as defined by claim 7, wherein said voltage-to-frequency converter includes an astable multivibrator in which the timing resistances are formed at least partially by the conducting paths of transistors, the base electrodes of which are supplied with a variable control voltage related to at least one operational variable of the engine.

9. An internal combustion engine as defined by claim 8, wherein there is further provided circuit means for limiting the maximum voltage supplied to the bases of said transistors.

10. An internal combustion engine as defined by claim 8, wherein said engine variable is the exhaust gas composition, and said means for sensing the exhaust gas composition is an oxygen sensor for generating a signal related to the partial pressure of oxygen in the exhaust gas.

11. An internal combustion engine as defined by claim 10, wherein the oxygen sensor is connected to the base of an impedance-converting transistor which is connected in a first voltage divider circuit, and wherein the tap of said first voltage divider circuit is connected to one output of a differential amplifier, the output of which is connected to said voltage-to-frequency converter.

12. An internal combustion engine as defined by claim 11, further comprising a second voltage divider circuit connected in parallel with said first voltage divider circuit, said first and second voltage divider circuits being joined by a diode which permits current to flow when a limiting value of said sensor output voltage is exceeded.

13. An internal combustion engine as defined by claim 1, wherein said conduit for supplying a gas to said engine is an air bypass line leading to a point in the induction manifold of said engine which is downstream of the air measuring portion of the fuel preparation system.

14. An internal combustion engine as defined by claim 1, wherein said conduit for supplying a gas to said engine is a line admitting air to said exhaust manifold and wherein said pneumatically actuated throttle is disposed therein.

15. An internal combustion engine as defined by claim 1, wherein said conduit for supplying a gas to said engine is a line leading from said exhaust manifold to said intake manifold.

* * * * *